Figure 1:
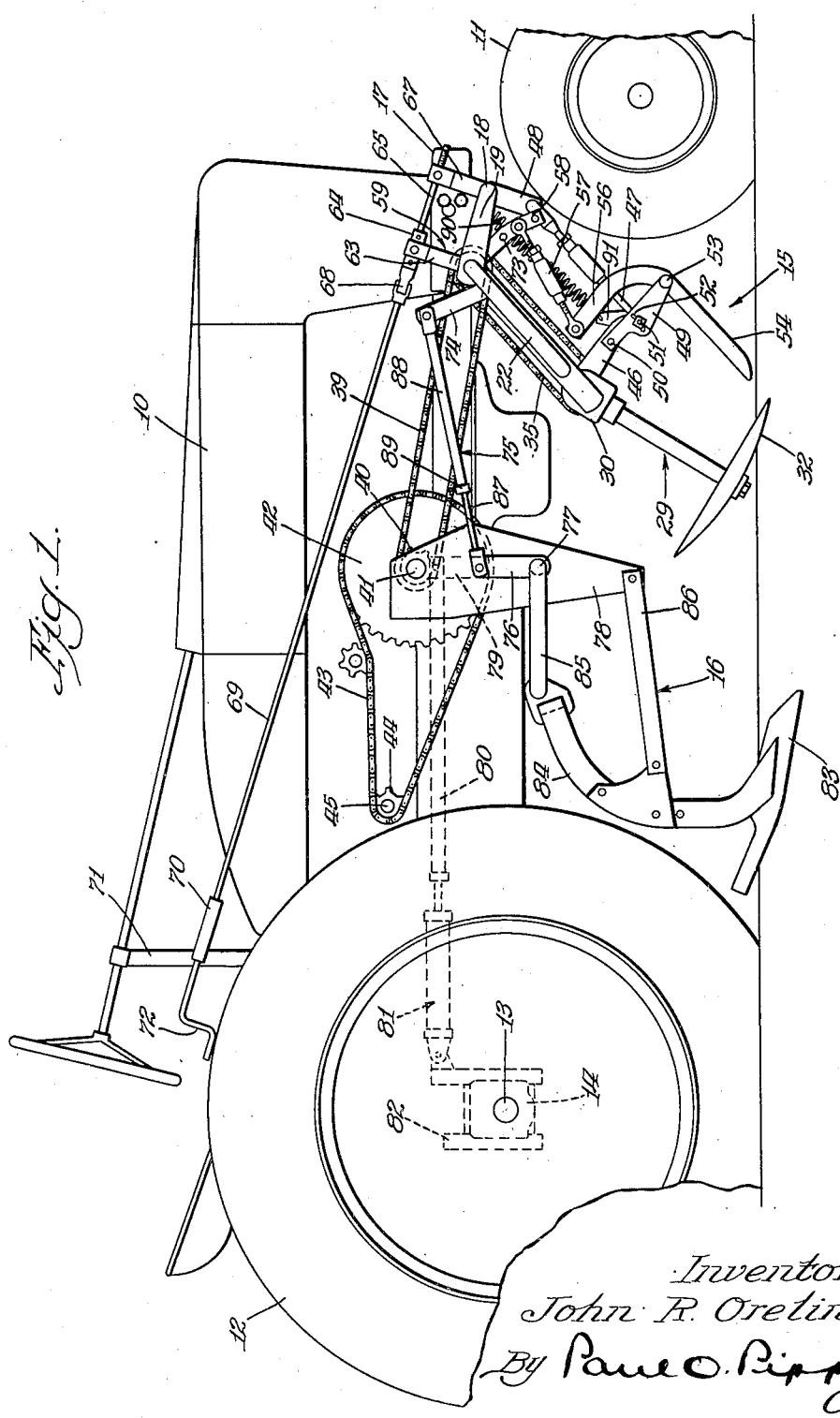

Dec. 13, 1949 J. R. ORELIND 2,491,203
BEET TOPPER
Filed Oct. 18, 1946 2 Sheets-Sheet 1

Inventor.
John R. Orelind
By Paul O. Pippel
Atty

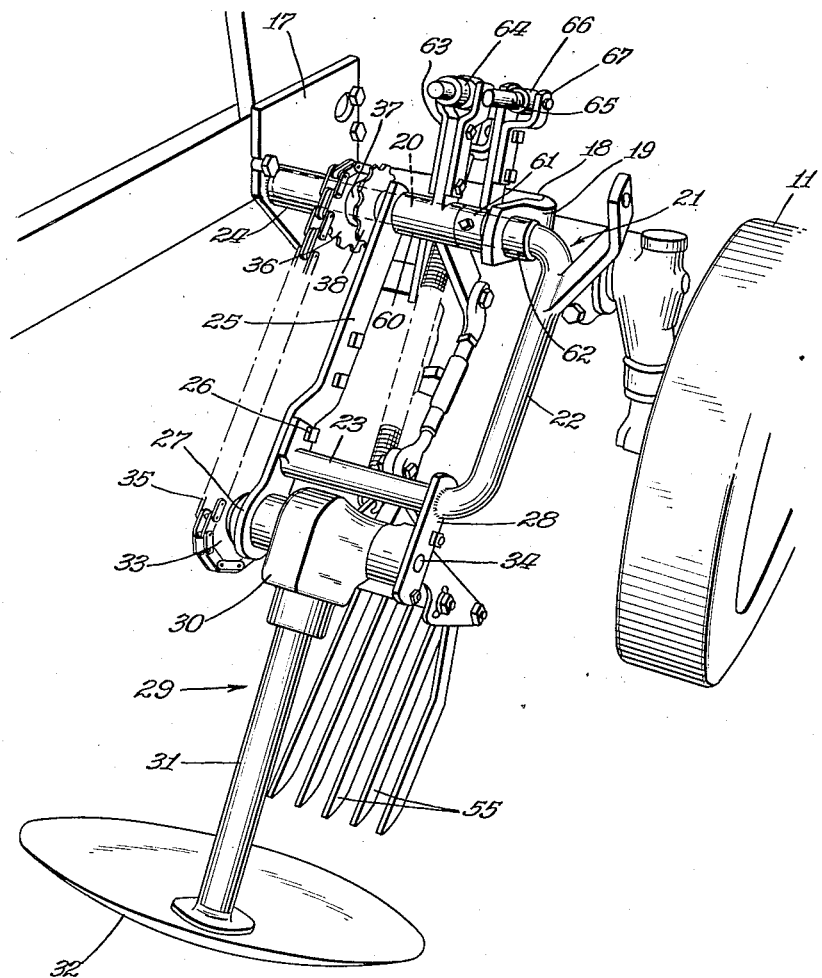

Patented Dec. 13, 1949

2,491,203

UNITED STATES PATENT OFFICE 2,491,203

BEET TOPPER

John R. Orelind, Wilmette, Ill., assignor to International Harvester Company, a corporation of New Jersey Application October 18, 1946, Serial No. 704,069

8 Claims. (Cl. 56—121.46)

1

This invention relates to agricultural implements and particularly to a harvesting machine for beets and the like. More specifically, the invention concerns a topping mechanism for removing the crown and foliage from the beet prior to removal of the beet from the soil.

The principal object of the present invention is to provide an improved topping mechanism for beets and the like.

Another object of the invention is to provide an improved mounting for a finder adapted to contact the beet tops and gauge the cutting portion of the blade in order to regulate the amount of crown to be removed.

Another object of the invention is to provide in a tractor-mounted topping mechanism for beets and the like, wherein a cutting blade and a gauge are provided, means accessible to the operator of the tractor to vary the spacing between the gauge and the blade for different sized beets.

A further object of the invention is to provide in a harvester for beets and the like an improved topping mechanism comprising the combination of a gauge and a cutting element and means for varying the ratio of movement between the gauge and the blade.

Other objects and advantages of the invention will become clear from the following detailed description when read in conjunction with the accompanying drawings, wherein:

Figure 1 is a view in side elevation showing an implement support in the form of a tractor having mounted thereupon beet machinery embodying the features of the present invention; and Figure 2 is a perspective view of the beet topping mechanism.

In the drawings, the topping mechanism of the present invention is illustrated as mounted upon a tractor 10 having front wheels 11 and rear drive wheels 12 mounted upon a transverse axle 13 carried by a rear axle supporting structure 14.

The beet machinery shown as mounted upon the tractor 10 comprises a topping unit 15 mounted at the forward end of the tractor for removing the crown and foliage from the beets and mounted therebehind a digger mechanism 16 for removing the topped beets from the ground.

The topping unit 15 is mounted upon the tractor by means including a plate 17 removably secured to the tractor and having welded or otherwise secured thereto a laterally extending brace member 18 having a rearwardly bent arm 19, the end of which is apertured to receive the transversely extending shaft portion 20 of a U-shaped member 21 having a downwardly and rearwardly extending arm portion 22 and a portion 23 bent at right angles to the arm portion and generally parallel to the shaft portion 20. Shaft 20 is parallel to the transverse part of the supporting member 18 and the inner end thereof is rotatably received in a bearing sleeve 24 welded or otherwise secured to the plate 17.

A strap 25 parallel to arm 22 of the member 21 is secured at one end to the shaft 20 centrally thereof and is affixed near its other end by a bolt 26 to the inner end of the portion 23. Strap 25 is provided with an extension 27 parallel to an arm 28 affixed to the arm 23, and a cutting blade unit 29 is pivotally mounted therebetween for swinging movement relative to the tractor and to the member 21.

The cutting blade mechanism 29 includes a housing 30 and a downwardly and rearwardly extending shaft structure 31 surrounding a shaft, not shown, having rotatably mounted at the lower end thereof a cutting disc 32. However, power for driving the cutting disc 32 is transmitted through suitable gearing contained in the housing 30 from a sprocket wheel 33 mounted upon a shaft 34 carried by the housing 30. The structure of the gearing contained in the housing 30 forms no part of the present invention and for the purpose of the invention may be regarded as conventional power transmission mechanism.

Sprocket wheel 33 is driven by a chain 35 which is also connected to a sprocket wheel 36 mounted upon a sleeve 37 journaled on the shaft 20. Another sprocket 38 secured to the sleeve 37 is connected by a chain 39 to a sprocket wheel 40 mounted upon a shaft 41 supported upon the tractor. Another sprocket 42 on the shaft 41 is connected by a chain 43 with a sprocket wheel 44 secured to a tractor power take-off shaft 45. Power for driving the cutting disc 32 is thus transmitted from the drive shaft 45 through chains 43, 39, and 35 to the shaft upon which the disc is mounted.

Fixed to or forming a part of the housing 30 is a depending standard 46 forming part of the supporting structure for the blade 32 and functioning as the support for one end of a downwardly and rearwardly extending link 47 which is adjustable in length and is pivotally connected at its other end to an arm 48 secured to and depending from the transverse portion of the supporting member 18. Link 47 thus serves with arm portion 22 of member 21 as a generally parallel link structure by which the topping mechanism is pivotally mounted upon the tractor, Thus in operation the topping disc 32 is capable of floating movement with respect to the tractor and due to its parallel link connection to the tractor moves upwardly in a substantially straight line.

Secured to the standard 46 and forming a part of the blade supporting structure is a member 49 which is pivotally connected at 50 to the member 46 and is adjustably secured thereto by a bolt 51 carried in the lower end of the standard 46 and received in a slot 52 in the member 49. The function of this slotted connection will appear hereinafter.

Pivotally mounted at 53 upon the lower end of the member 49 is a finder or gauge shoe 54 which is a fork-like member provided with fingers 55 and an upwardly bent arm portion 56. Since the finder or gauge 54 is mounted upon the standard 46 forming a part of the blade supporting structure, it should be clear that the gauge 54 will partake of the pivotal movement of the cutting blade structure 29 about shaft 34 with respect to the parallel links 22 and 47 and with respect to the tractor. The gauge 54 is adjustably held against pivotal movement with respect to the cutting disc structure by adjusting mechanism including a link 57 pivotally connected at one end to the upper portion of the arm 56 of the gauge. The link 57 is adjustable in length and the other end thereof is pivotally connected to an arm 58 of a bell crank 59 pivotally mounted upon a spacing sleeve 60 rotatable upon the shaft portion 20 of the member 21. The shaft portion 20 is held against displacement with respect to the arm 19 by a pair of collars 61 and 62 on opposite sides of the arm 19.

An upwardly extending arm 63 of the bell crank 59 is bifurcated at its upper end to receive for pivotal movement a swivel 64 apertured to receive for sliding movement therein a rod 65 which is threaded at one end for reception in a threaded swivel 66 pivotally mounted at the upper end of an arm 67 rigidly secured to the transverse portion of the supporting structure 18. The other end of the rod 65 is connected by a universal joint 68 with a rod 69 slidably received in a sleeve member 70 suitably secured to the steering post 71 of the tractor and is provided at its rear end with a manually operable crank 72. Operation of the crank 72 thus rocks the bell crank 59 which, through link 57, causes the gauge 54 to swing about its pivot 53. The gauge 54 is thus rigidly held in a fixed position with respect to the disc 32 and is adjustable to vary the vertical spacing therebetween by manipulation of the crank 72. This adjustment is for the purpose of varying the amount of crown to be removed from the beet inasmuch as the thickness of crown to be removed depends upon the size of the beet.

Upon encountering beets of varying size and height above the ground, the gauge 54 moves upwardly and swings the parallel links 22 and 47 about their pivots upon the tractor and carries with it the cutting disc 32. Under normal circumstances the variation in size of the beets is relatively unimportant and when the gauge 54 passes from the top of one beet to the next in a row it is generally preferable to have the cutting disc 32 and the gauge 54 move upwardly at substantially the same rate so that the thickness of crown removed from successive beets in a row will be the same. In passing from one field of beets to another, or when the size of beets in one part of a field differs from the beets in another part of the field, the vertical position of the gauge with respect to the cutting disc may be varied by manipulating the adjusting mechanism 72 so that a thicker crown may be removed from the larger beets than from that portion of the field where the smaller beets are growing.

It will be noted that the arm 58 of the bell crank 59 is provided with a plurality of openings 73 for the connection of the link 57 thereto. Under the normal circumstances referred to where it is desired to maintain a uniform vertical spacing between the gauge and the cutting disc, the link 57 is connected to the arm 58 of the bell crank at the uppermost opening therein. In such position the link 57 is substantially parallel to the links 22 and 47 so that the gauge does not swing about its pivot 53 upon upward movement of the topping unit. On the other hand, as sometimes happens, it is desirable in order to cut the proper amount of top from a beet depending upon its size to cause gauge 54 to move at a different rate from disc 32 when rising and falling in response to the variations in height above the ground of the beets to be topped. Since the crown removed from a large beet is preferably thicker than that removed from smaller beets, it should be clear that the gauge 54 must move upwardly faster than the cutting edge of the disc 32 when passing from a small beet to a large beet. Under such circumstances the link 57 instead of being connected to the upper opening 73 in the arm 58 is connected to one of the lower apertures therein as shown in Figure 1. In this position the link 57 is not parallel to either of the links 22 or 47 and the gauge is caused to swing automatically about its pivot 53 upon vertical movement thereof. Thus in passing from beet to beet in a row when the beets vary in size the ratio of movement between the gauge and the cutting disc is automatically varied. It is also sometimes necessary to adjust the longitudinal spacing between the disc 32 and the gauge 54, and this is accomplished by loosening the nut upon the bolt 51 and sliding it in the slot 52.

As already pointed out the topping unit 15 is capable of vertical floating movement with respect to the tractor. Movement of the topping unit vertically between operating and transport positions is accomplished by a mechanism including an arm 74 extending upwardly from and affixed to the member 21. Arm 74 is connected by a link 75 with an arm 76 secured to a transverse shaft 77 carried by one or more plates 78 supported upon the tractor body and depending therefrom. Shaft 77 extends transversely under the tractor body to the opposite side thereof and upon the opposite end of the shaft is secured an arm 79 which is connected by a rod 80 to a cylinder and piston unit 81 pivotally connected to an attaching structure 82 mounted upon the rear axle housing 14 of the tractor. Cylinder and piston unit 81 is preferably hydraulically operated through the medium of a pump, not shown, supplying fluid to the cylinder and deriving its power from the tractor power plant. The digging unit 16 which removes the beets from the soil after they had been topped comprises a pair of plates 83 mounted at the lower end of a standard 84, the upper end of which is connected by a link 85 to the shaft 77. A lower link 86 is pivotally connected at one end to the standard 84 and at its other end to the plate 78. The upper link 85 is affixed to the shaft 77 so that upon actuation of the hydraulic cylinder unit 81 to rock the arm 79, the shaft 77 is likewise rocked to lift the digging unit 83.

Lifting motion is transmitted from the hydraulic cylinder unit 81 through shaft 77 and arm 76 to the link structure 75 which comprises a rod 87 connected to the arm 76 and slidably received in a sleeve 88 connected to the arm 74. A collar 89 is adjustable on the rod 87 and engages the end of the sleeve 88 so that upon forward rocking movement of the arm 76, arm 74 is likewise rocked forwardly to swing the parallel links 22 and 47 about their respective pivots upon the tractor to lift the topping unit 15. The vertical floating movement of the topping unit 15 in operating position thereof is accommodated by the sliding of sleeve 88 upon the rod 87, downward movement of the topping unit being limited by the position of the stop collar 89.

If desired, of course, power means other than the hydraulic cylinder unit 81 may be utilized for moving the topping unit between transport and operating positions. It may likewise be understood that if desired the manual adjustment 72 for the regulation of gauge 54 may be replaced by a suitable power mechanism, for example, another hydraulic cylinder and piston unit similar to unit 81 and operable independently thereof. An extension spring 90 is provided to assist lifting and connected between a lug 91 secured to the standard 46 and the arm 67 carried by the supporting member 19.

It is believed that the operation of the topping mechanism of the present invention will be clearly understood from the foregoing description. It should likewise be understood that the invention has been described in its preferred embodiment and that modifications may be made therein without departing from the spirit of the invention or the scope of the appended claims.

What is claimed is:

1. In a topper for beets or the like, in combination, a support, a link mounted on the support for swinging movement in a vertical plane, a cutting element carried by the link for movement therewith, a gauge shoe carried by the link in advance of the cutting element for movement therewith to gauge the position of the cutting element, an adjusting mechanism on the support, and connecting means between the adjusting mechanism and the gauge shoe to move the latter relative to the cutting element and vary the spacing therebetween, including a second link connecting the gauge shoe to the adjusting device and substantially parallel to the first mentioned link.

2. In a topper for beets or the like, in combination, a support, a link mounted on the support for swinging movement in a vertical plane, a cutting element carried by the link for movement therewith, a gauge shoe carried by the link in advance of the cutting element for movement therewith to gauge the position of the cutting element, an adjusting mechanism on the support, connecting means between the adjusting mechanism and the gauge shoe to move the latter relative to the cutting element and vary the spacing therebetween, including a second link connecting the gauge shoe to the adjusting device and substantially parallel to the first mentioned link, and means for adjusting the second link to non-parallel positions with respect to the first mentioned link, whereby to provide differential movement between the cutting element and the gauge shoe to automatically vary the amount of top removed from the beets.

3. In a topper for beets or the like, in combination, a support, a link mounted on the support for swinging movement in a vertical plane, a cutting element carried by the link for movement therewith, a gauge shoe carried by the link in advance of the cutting element for movement therewith and pivotally mounted thereon for swinging movement relative to the cutting element to gauge the position of the cutting element, an adjusting mechanism on the support, and connecting means between the adjusting mechanism and the gauge shoe to swing the latter relative to the cutting element and vary the spacing therebetween, including a second link connecting the gauge shoe to the adjusting device and substantially parallel to the first mentioned link.

4. In a topper for beets or the like, in combination, a support, a link mounted on the support for swinging movement in a vertical plane, a cutting element carried by the link for movement therewith, a gauge shoe carried by the link in advance of the cutting element for movement therewith to gauge the position of the cutting element, an adjusting mechanism on the support, connecting means between the adjusting mechanism and the gauge shoe to move the latter relative to the cutting element and vary the spacing therebetween, including means serving as a bell crank mounted on the support, connecting means between the adjusting device and an arm of the bell crank to swing the latter, and a second link pivotally connecting the other arm of the crank to the gauge shoe for adjusting the position of the latter relative to the cutting element.

5. In a topper for beets or the like, in combination, a support, a link mounted on the support for swinging movement in a vertical plane, a cutting element carried by the link for movement therewith, a gauge shoe carried by the link in advance of the cutting element for movement therewith to gauge the position of the cutting element, an adjusting mechanism on the support, connecting means between the adjusting mechanism and the gauge shoe to move the latter relative to the cutting element and vary the spacing therebetween, including means serving as a bell crank mounted on the support, connecting means between the adjusting device and an arm of the bell crank to swing the latter, and a second link pivotally connecting the other arm of the crank to the gauge shoe for adjusting the position of the latter relative to the cutting element, said second link being substantially parallel to the first mentioned link and optionally adjustable to non-parallel positions with respect to said first mentioned link, whereby to vary the ratio of movement between the gauge shoe and the cutting element.

6. In combination with a tractor, a topping mechanism for beets and the like comprising vertically spaced generally parallel links pivoted on the tractor for floating movement in a vertical plane, a supporting member connecting the free ends of said links, a cutting element carried by the supporting member, a gauge member carried at the ends of said links arranged to engage the beets and gauge the position of the cutting element, said gauge member being mounted on said links for swinging movement relative thereto and to the cutting element, control means on the tractor for regulating the relative spacing between the gauge member and the cutting element, and a connection between the control means and said gauge member including another link generally parallel to at least one of the first mentioned links for transmitting movement of the control means to the gauge member.

7. In combination with a tractor, a topping mechanism for beets and the like comprising vertically spaced generally parallel links pivoted on the tractor for floating movement in a vertical plane, a supporting member connecting the free ends of said links, a cutting element carried by the supporting member, a gauge member carried at the ends of said links arranged to engage the beets and gauge the position of the cutting element, said gauge member being mounted on said links for swinging movement relative thereto and to the cutting element, control means on the tractor for regulating the relative spacing between the gauge member and the cutting element, a connection between the control means and said gauge member including another link generally parallel to at least one of the first mentioned links for transmitting movement of the control means to the gauge member, and means for selectively adjusting said other link between positions in parallel and non-parallel relation to the first mentioned links.

8. In combination with a tractor, a topping mechanism for beets and the like comprising vertically spaced generally parallel links pivoted on the tractor for floating movement in a vertical plane, a supporting member connecting the free ends of said links, a cutting element carried by the supporting member, a gauge member pivoted on the supporting member, means for swinging the gauge member relative to the cutting element to vary the vertical distance therebetween and regulate the amount of beet top to be removed comprising a rock arm mounted on the tractor, control means accessible to the tractor operator for swinging said arm, and another link connecting said arm to said gauge member.

JOHN R. ORELIND.

REFERENCES CITED

The following references are of record in the file of this patent:

UNITED STATES PATENTS

| Number | Name | Date |
|---|---|---|
| 1,462,486 | Devey | July 24, 1923 |
| 2,337,698 | Walz | Dec. 28, 1943 |